June 12, 1962 — G. W. MORGAN — 3,038,568
CURTAINWALL
Filed Nov. 25, 1959 — 6 Sheets-Sheet 1
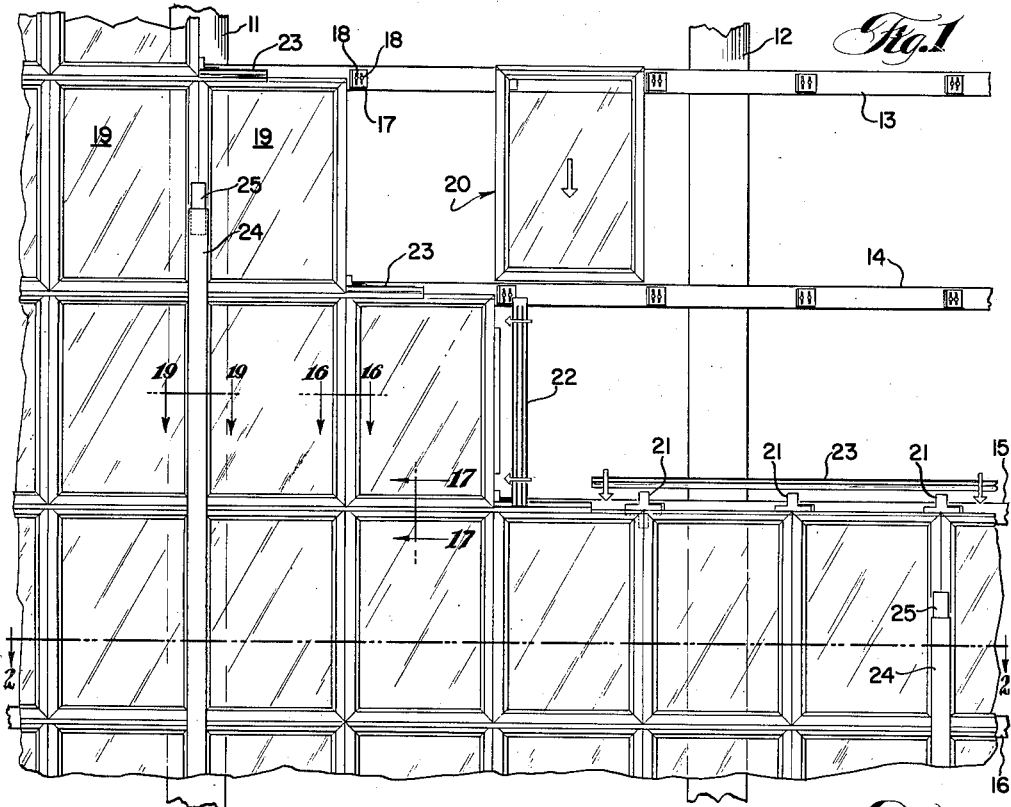
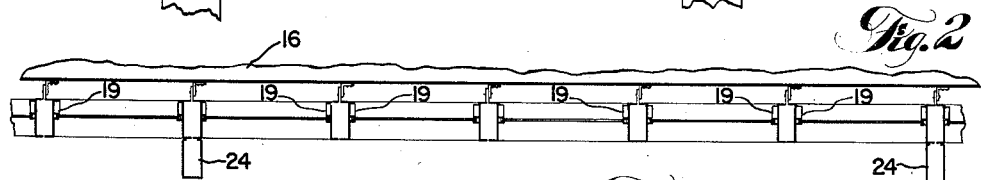
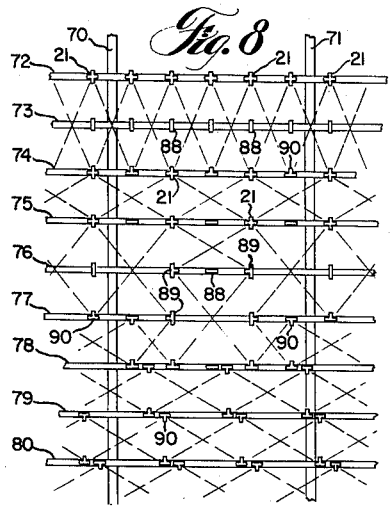
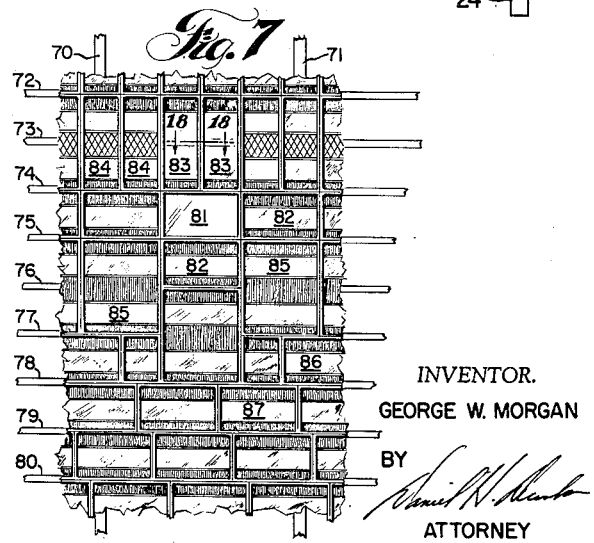
INVENTOR.
GEORGE W. MORGAN
BY
ATTORNEY June 12, 1962  G. W. MORGAN  3,038,568
CURTAINWALL
Filed Nov. 25, 1959  6 Sheets-Sheet 2
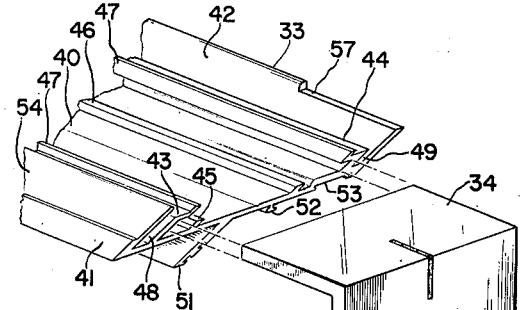
Fig.5
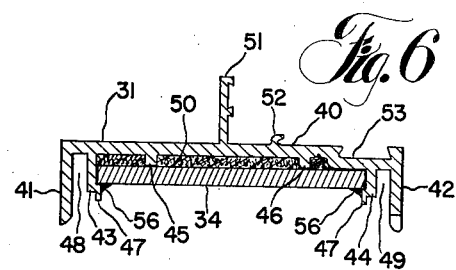
Fig.6
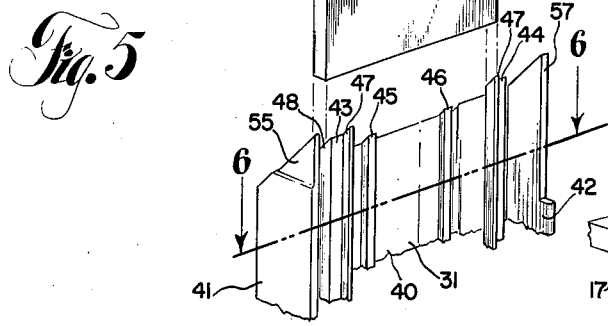
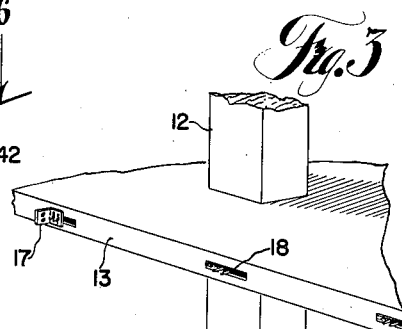
Fig.3
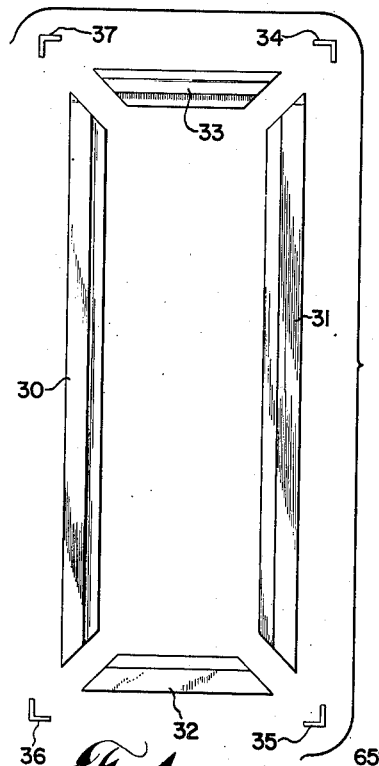
Fig.4
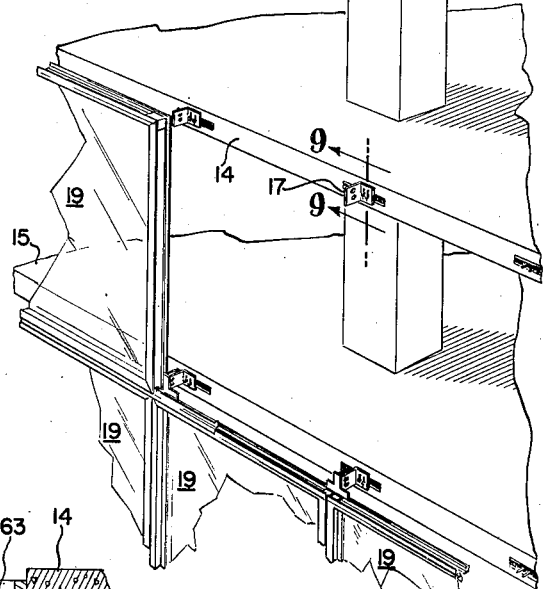
Fig.9
INVENTOR.
GEORGE W. MORGAN
BY
ATTORNEY June 12, 1962 G. W. MORGAN 3,038,568
CURTAINWALL
Filed Nov. 25, 1959 6 Sheets-Sheet 3
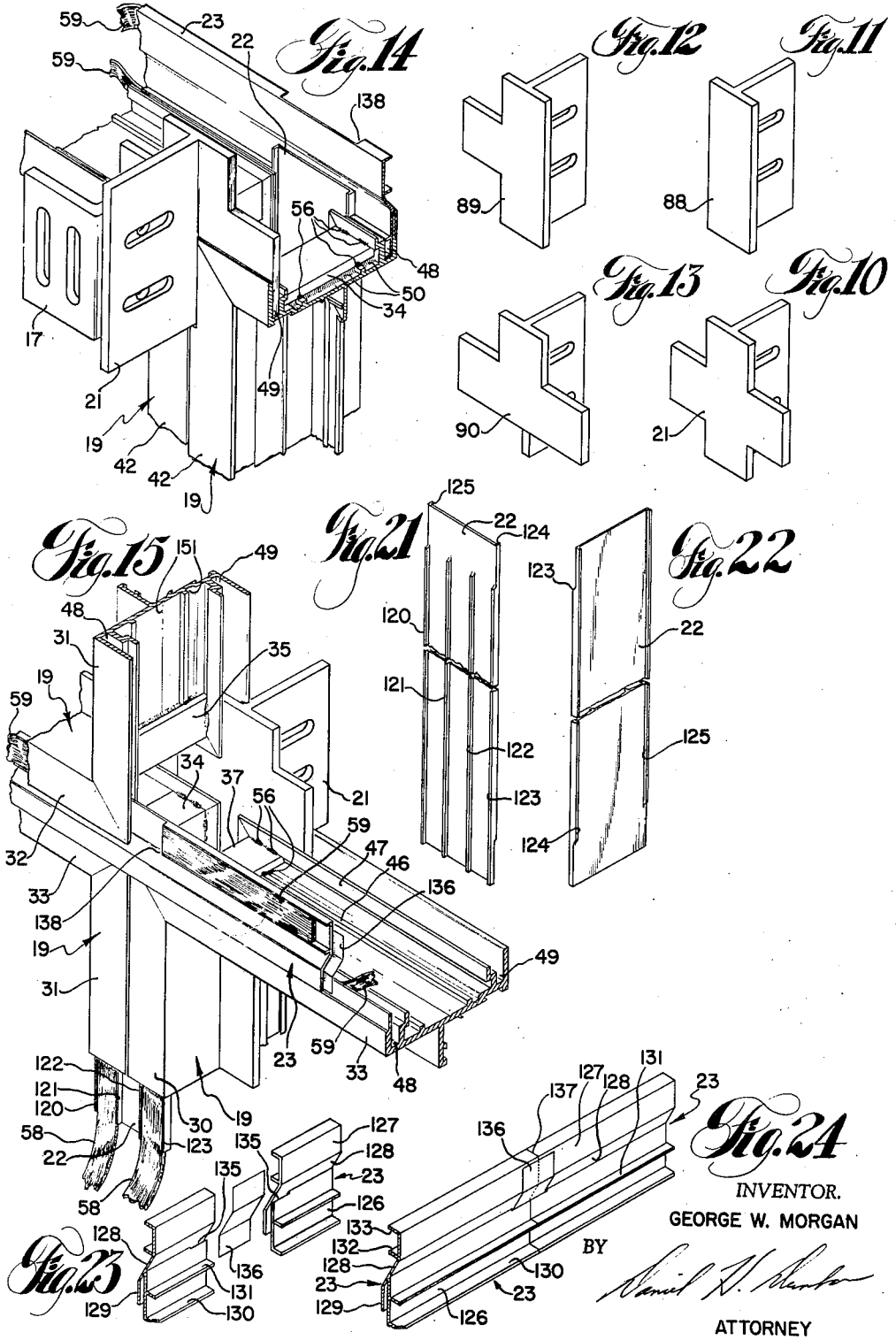
INVENTOR.
GEORGE W. MORGAN
BY
ATTORNEY

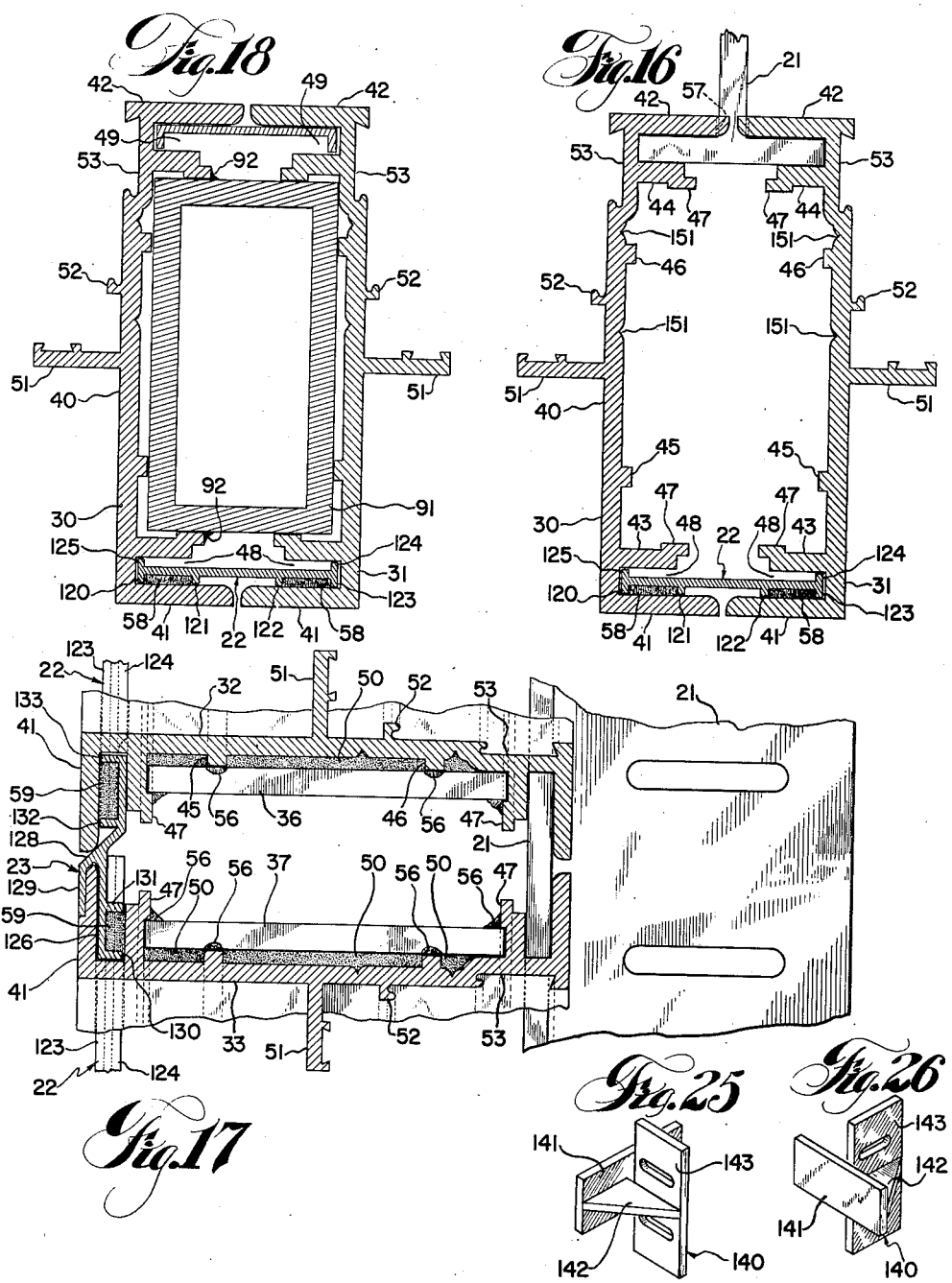

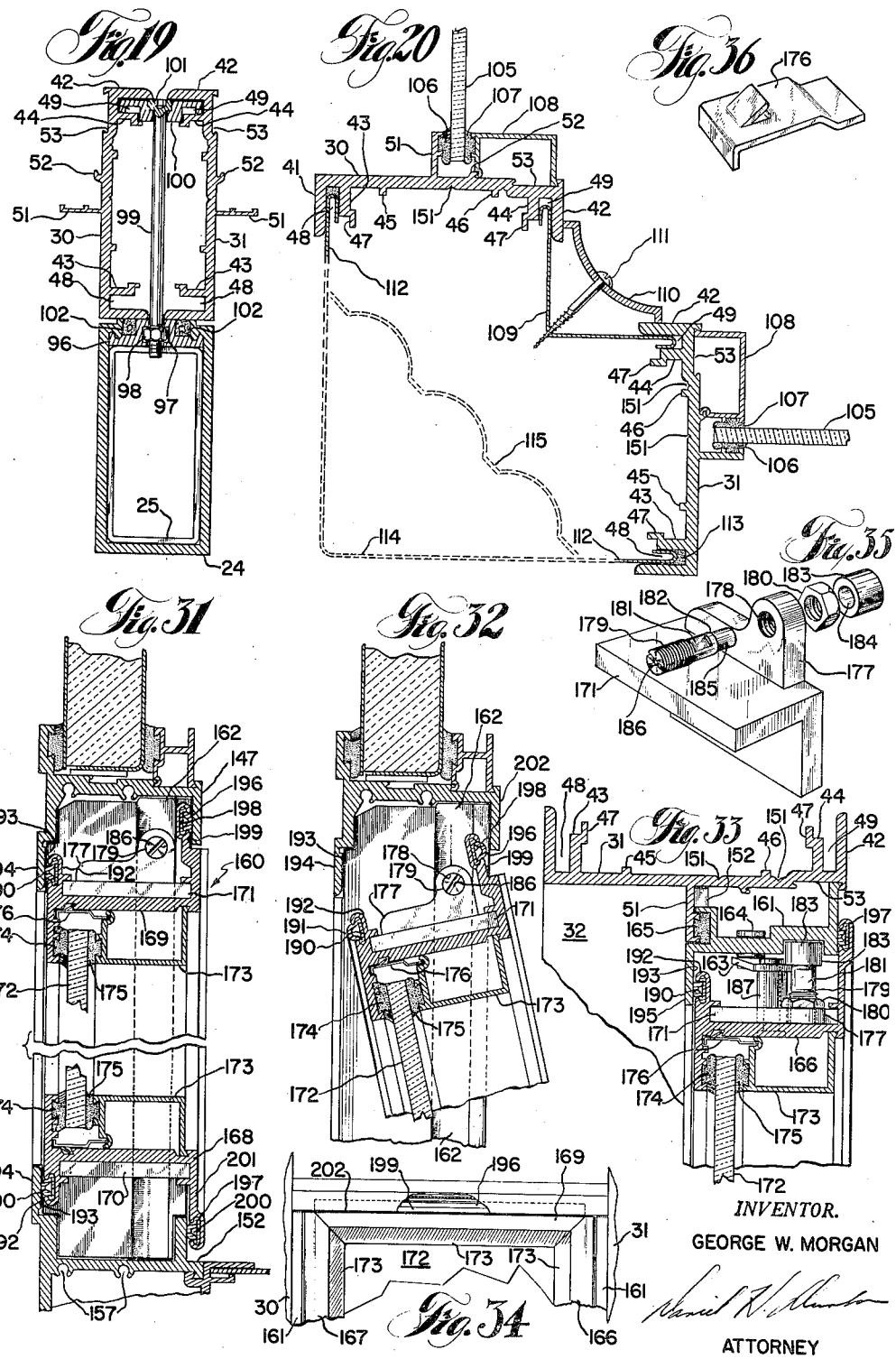

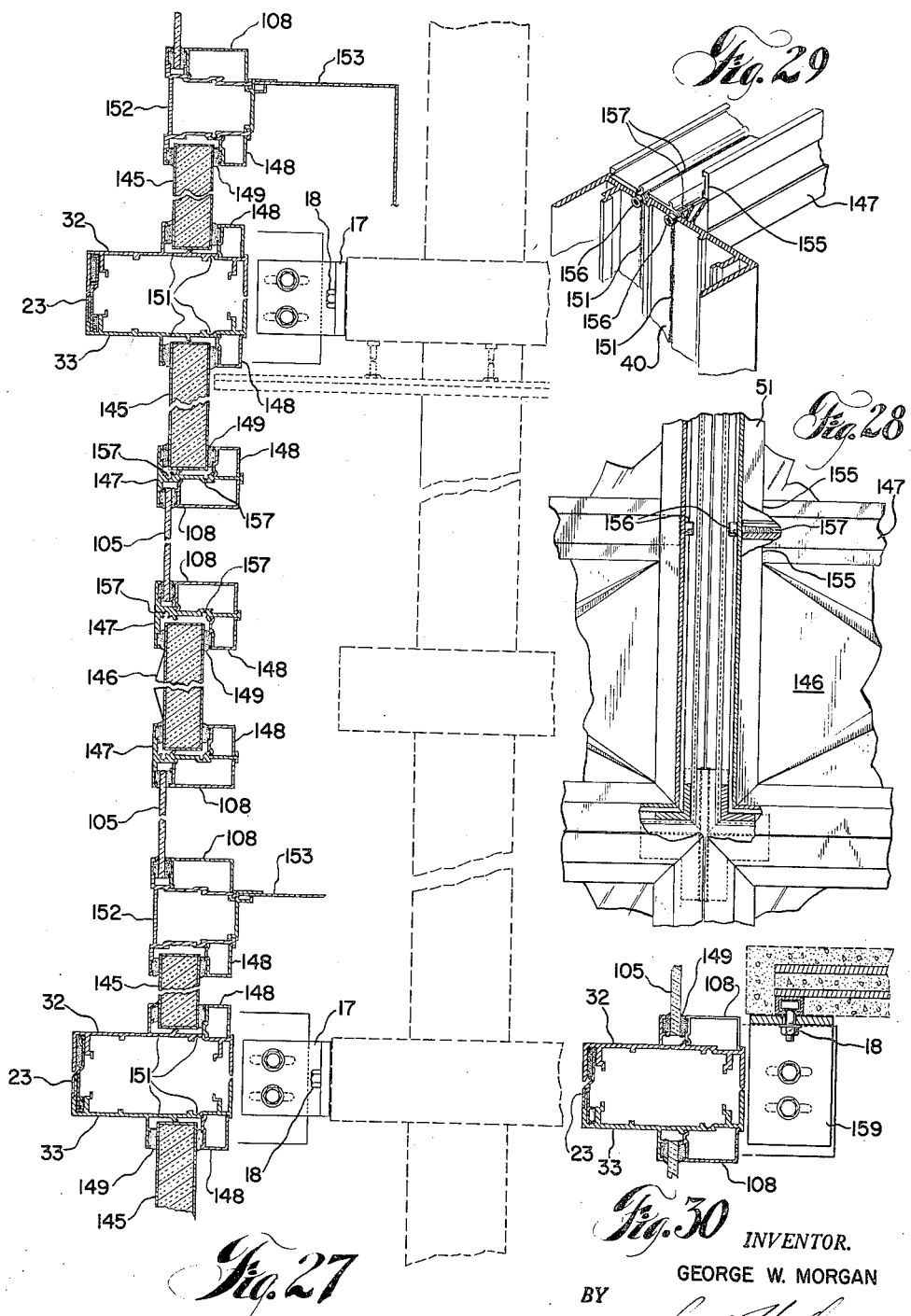

United States Patent Office 3,038,568
Patented June 12, 1962

3,038,568
CURTAINWALL
George W. Morgan, Columbus, Ohio, assignor to
North American Aviation, Inc.
Filed Nov. 25, 1959, Ser. No. 855,378
4 Claims. (Cl. 189—34)

This invention relates generally to curtainwall and concerns an improved curtainwall system and the curtainwall system components incorporated therein.

Conventional curtainwall systems and known curtainwall system components typically present difficulties with respect to installation, with respect to weathersealing, and with respect to fabrication. Also, problems have been encountered with such systems and components in connection with thermal expansion and contraction, and in connection with versatility for achieving varied architectural design effects.

It is an important object of this invention to provide a curtainwall system which utilizes a novel means and method for attaching prefabricated panel assemblies to a building structure thereby providing advantages as to compensation for dimensional irregularities and as to ease of installation.

Another object of this invention is to provide a curtainwall system with an expansion-contraction joint construction for use in combination with prefabricated panel assemblies to thereby obtain freedom of thermal adjustment without loss of weathersealing capability.

Another object of my invention is to provide a new weathersealing means at the intersections of horizontally and vertically extending expansion joints in a curtainwall system essentially comprised of prefabricated wall panel assemblies.

A still further object of this invention is to provide a curtainwall system panel assembly frame construction which may be readily welded to achieve a unitized form without thereby causing the defacing or marring of finally-exposed surfaces.

Another object of my invention is to provide a ventilator unit for combination with a prefabricated wall panel assembly and which utilizes an improved weathersealing means.

Another object of this invention is to provide an improved reinforcement means for vertical mullion portions of a curtainwall system that utilizes prefabricated panel assemblies of either multi-story height or of extensive width.

Another object of this invention is to provide a curtainwall system prefabricated wall panel assembly with a novel means and method for securing a sub-panel rail member therein.

A still further object of this invention is to provide an improved curtainwall system which is comprised essentially of standardized components but which effectively achieves custom design effects.

Another object of my invention is to provide a curtainwall system with novel constructions which readily permit the use of sub-panel inserts having decorative qualities.

Other objects and advantages of my invention will become apparent during consideration of the detailed description.

In the drawings:

FIG. 1 illustrates elements of the curtainwall system of this invention in combination with structural portions of a building;

FIG. 2 is a section taken at line 2—2 of FIG. 1;

FIG. 3 is a perspective view of a portion of the building system illustrated in FIGS. 1 and 2;

FIGS. 4 through 6 illustrate construction details of the frame portion of a wall panel assembly comprising a part of my invention;

FIG. 7 is similar to FIG. 1 but illustrates the various design effects which may be achieved by including alternate arrangements of comparable wall panel assemblies in the curtainwall system of this invention;

FIG. 8 illustrates an anchor member arrangement utilized in the curtainwall system embodiment of FIG. 7;

FIG. 9 is a section taken at line 9—9 of FIG. 3;

FIGS. 10 through 13 illustrate, in greater detail, the anchor members shown in FIGS. 1 and 8;

FIGS. 14 and 15 illustrate details of securing individual wall panel assemblies into the curtainwall system of this invention;

FIGS. 16 and 17 are sections taken at the lines 16—16 and 17—17, respectively, of FIG. 1;

FIG. 18 is a section taken at line 18—18 of FIG. 7;

FIG. 19 is a section taken at line 19—19 of FIG. 1;

FIG. 20 is a section which details a corner closure that may be used in the curtainwall system of this invention;

FIGS. 21 and 22 pertain to a removable vertical spline element provided for weathersealing and aligning purposes;

FIGS. 23 and 24 illustrate a removable horizontal spline element provided in this invention for weathersealing and aligning purposes;

FIGS. 25 and 26 are views of an alternate form of anchor member;

FIG. 27 is a section which illustrates alternate sub-panel arrangements which may be used with the wall panel assembly of this invention;

FIG. 28 illustrates sub-panel rail members installed in the frame portion of a wall panel assembly of this invention;

FIG. 29 is a perspective view of a portion of a wall panel assembly illustrated in FIG. 28;

FIG. 30 illustrates an alternate arrangement for securing wall panel assemblies of this invention to a building floor slab;

FIGS. 31 through 35 illustrate details of an improved vent unit which may be incorporated into the curtainwall system of this invention; and FIG. 36 relates to a clip device which may be used advantageously with the vent unit construction illustrated in FIGS. 31 through 35.

Elements of the preferred curtainwall system of this invention are illustrated in FIG. 1 in combination with portions of a building support structure. Such support structure includes columns 11 and 12, the spaced-apart floors 13 through 16, and support brackets 17. Support brackets 17 serve for connecting the curtainwall system of this invention to the building support structure, and are each attached to the floors by a typical fastener arrangement 18.

Also illustrated in FIG. 1 are the wall panel assemblies 19 contained in the curtainwall system. Wall panel assembly 20 differs from each panel assembly 19 only in that it is illustrated as being in an intermediate installation position prior to being secured to the support structure. Other system elements illustrated in FIG. 1 are anchor members 21, vertical spline element 22, and horizontal spline elements 23. The use of vertical accent mullions 24 and alignment sleeve inserts 25 is optional. For clarity of illustration, wall panel assemblies 19 and 20 are shown as being fully glazed. Such panel assemblies might alternatively include one or more of various hereinafter-described sub-panels or combinations thereof. Also, with respect to FIG. 1, elements 22 and 23 are illustrated in an intermediate position prior to complete installation.

Details regarding the fabrication of the frame portion of a wall panel assembly 19 are best illustrated in FIGS. 4 through 6. In the exploded view of FIG. 4, a typical frame assembly is illustrated as being comprised of vertical frame members 30 and 31, horizontal frame members 32 and 33, and corner angles 34 through 37. The ends of each frame member are appropriately mitered to provide a gap-free corner joint upon the frame assembly. The principal cross-section of each of frame members 31 through 33 is generally the same and is shown in FIGS. 5 and 6. Such cross-section is essentially channel-shaped, and is comprised of a base part 40 having the outer flanges 41 and 42 formed integral therewith. Spaced-apart from flange portions 41 and 42 to establish locating grooves 48 and 49 are integral inner flange means 43 and 44. Support rib portions 45 and 46 are also provided integral with base part 40. Flange means 43 and 44 are each additionally provided with an offset extreme 47 that serves as a transverse restraint for cooperating corner angle 34 and that has utility in welding the wall panel frame portion as a unit. A conventional weathersealant 50 is injected into the various slots defined by corner angle 34, base portion 40, support ribs 45 and 46, and flange means 43 and 44. The stops designated 51 and 52 and the dovetail groove 43 are provided for purposes which are hereinafter-detailed. Also, it is preferred that the exteriorly located flange 41 of each frame member 33 be provided with an offset surface portion 54 to receive a leg of a horizontal spline element 23 during installation of the curtainwall system. This feature provides a flush-faced mullion installation upon complete assembly. Accordingly, a similar offset surface portion 55 is provided in the flange 41 of each of frame members 30 and 31 at the upper end only. A relief 57 is provided at each end of each flange means 42 to facilitate assembly engagement with an anchor member.

To assemble the frame portion of a wall panel assembly 19, the following procedure is suggested. Frame members 30 through 33 are first mitered at a proper length. The various corner angle members 34 through 37 are then engaged with the slot defined in part by inner flange means 43 and 44, support rib portions 45 and 46, and the offset extremes 47, at each end of each frame member. The frame members are then brought into abutting relation with each other so as to completely engage each corner angle in the defined slot. A suitable welding technique is then employed to provide the fillet welds 56 which secure frame members 30 through 33 to corner angles 34 through 37. Such welds are provided at selected regions which are entirely interiorly located to thereby eliminate the defacing or marring of visible exterior surfaces of the assembly during welding. See FIG. 15 wherein such fillet welds are illustrated as being located to connect angle 34 to offset extremes 47 and to support ribs 45 and 46. Sealant 50 is laid in the interior corner of corner angles 34 through 37, prior to assembly with frame members 30 through 33. Sealant 50 is resistant to the actions of both caustic etch procedures and anodizing baths. A slot is sawed at the midpoint of corner angles 34 through 37 to permit drainage of caustic etchant, rinse waters, and anodizing baths.

The curtainwall installation illustrated in FIG. 1 includes prefabricated wall panel assemblies 19 that are each fully glazed and that are aligned in vertical and horizontal rows with respect to each other. FIG. 7, however, illustrates an alternate embodiment of the curtainwall system of this invention wherein other wall panel assemblies are arranged differently with respect to each other to obtain various architectural design effects. Wall panel assemblies having the features of my invention are illustrated in FIG. 7 in secured relation to the building support structure which includes columns 70 and 71 and floors 72 through 80. Wall panel assembly 81 is fully glazed but differs from typical wall panel assembly 19 in that it has approximately a double panel width. Assembly 82 corresponds in size to wall panel assembly 81 but includes upper and lower sub-panel inserts which each have the form of an insulated spandrel element. An intermediate glazed section separates the upper and lower sub-panel portions of each panel assembly 82. Assembly types 83 and 84 are of a typical width but have approximately a double height. Assembly 83 includes a glazed section located intermediate upper and lower sub-panel inserts in the manner of wall panel assembly 82. Wall panel assemblies 84 each utilize a decorative spandrel sub-panel insert to further separate the intermediate glazed section into upper and lower portions. Each such portion serves as a window area for a separate floor. Wall panel assemblies 85 are illustrated as being approximately double the size, in width and in height, of a typical panel assembly 19. Again, an intermediate sub-panel is utilized to develop separate glazed sections. Wall panel assemblies 86 and 87 correspond to assembly type 82 in size, construction, and appearance. However, assemblies 86 and 87 are illustrated as being in staggered or offset relation with respect to the principal vertical alignment of panels 81 through 85.

FIG. 8 illustrates the location and form of various anchor members which are utilized to secure panel assemblies 81 through 87 of FIG. 7 to the building support structure. See also FIGS. 10 through 13. Anchor member 21 (FIG. 10) corresponds to the anchor member illustrated in FIG. 1 and has a cross-shaped configuration. Member 21 is utilized to secure the adjacent corners of four separate wall panel assemblies to the building structure. Anchor member 88 (FIG. 11) has the form of an "I" and is utilized principally to secure intermediate edge portions of two adjacent muti-story wall panel assemblies to the building. As illustrated in connection with floor 76, anchor member 88 may be oriented horizontally to secure top and bottom horizontal frame members of adjacent wall panel assemblies to the building at intermediate locations. Anchor members 89 (FIG. 12) and 90 (FIG. 13) are T-shaped and may be oriented to engage two adjacent corners and an intermediate edge portion of a wall panel assembly grouping.

An acceptable technique for securing the previously-mentioned support brackets 17 to a building structure is illustrated in FIG. 9. A slotted channel member 60 is cast in, or otherwise secured to, floor 14 and has the fastener 18 engaged therewith. The head portion 61 of fastener 18 is preferably transversely elongated and passes through the slot of channel 60 when aligned therewith but prevents rotation of the attached threaded shank 62 beyond limited initial rotation. Nut 63 engages the threaded end of shank 62 after shank 62 is engaged with the slot 64 provided in bracket 17. Holes 65 are provided in bracket 17 for attaching an anchor member used with this invention thereto.

FIG. 1 should be referred to for a better understanding of one manner of installing the basic curtainwall system components of my invention in a multi-story arrangement. Anchor members 21 (or their equivalent) for at least a portion of a particular floor slab are secured to previously-installed support brackets 17. A wall panel assembly 19 is then located so that groove portions 49 contained in the frame assembly lower corner regions are engaged with a pair of adjacent anchor members. The properly located wall panel assembly is temporarily blocked in position. Next, a vertical spline element 22, having a suitable sealing means 58 provided thereon, is inserted in the vertically extending groove 48 of one vertical frame member of assembly 19. Another wall panel assembly 19 is then brought into cooperation with the positioned spline element 22 and with another pair of adjacent floor slab anchor members. Groove portions 49 at the lower corner regions of the subsequent assembly 19 are engaged with various leg portions of the anchor members. Thereafter, an anchor member 21 (or its equivalent) is engaged with the upper corner locating grooves 49 of the so-mounted wall panel assemblies and is secured to a support bracket 17. The previously-utilized temporary blocking may then be removed. This method of installation is repeated as the wall panel assemblies for a particular floor level are installed.

In connection with multi-story installations, horizontal spline members 23 having a sealing means 59 provided thereon are engaged with groove portions 48 along the upper horizontal edge of previously-installed wall panel assemblies 19, and additional wall panel assemblies are then located upon the previously-fastened anchor members. Such assemblies are also joined with vertical spline elements. When two horizontally adjacent panel assemblies have been located in the new horizontal row, anchor member (21) is engaged therewith at the upper adjoining corners and is attached to a support bracket 17. This general technique of installation is pursued until the building structure is closed with the entire curtainwall system. Details regarding the engagement of wall panel assemblies with an anchor member and with the above-mentioned horizontal and vertical spline elements are illustrated in FIGS. 14 and 15.

FIGS. 16 and 17 are sectional views taken at the lines 16—16 and 17—17, respectively, of FIG. 1. FIG. 17 further illustrates the relation whereby weathersealing is provided at the intersection of the horizontally and vertically extending expansion joints in the curtainwall system of this invention. As previously noted, horizontal spline member 23 is contained in groove portions 48 of adjacent frame members 32 and 33. The lower extreme of the upper vertical spline member 22 is located on the weather-side of member 23. The upper extreme of lower vertical spline member 22 is located at the building or opposite side of horizontal spline 23. Details regarding such horizontal and vertical spline members whereby the weathersealing construction of this invention is obtained are shown hereinafter in connection with FIGS. 21 through 24.

FIG. 18 illustrates a tube-like reinforcing member 91 which may be advantageously incorporated in the curtainwall system of this invention. Such reinforcing member is particularly useful in connection with wall panel assemblies which are of multi-story height. As in FIG. 7, member 91 may be located intermediate the panel assemblies designated 83 in the region of floor slab 73. In the preferred form, member 91 is welded to either frame member 30 or frame member 31 by the welds designated 92. It is necessary only that reinforcing member 91 be attached to one such frame member and, if desired, member 91 may be incorporated into a wall panel assembly at the time of shop fabrication. By this arrangement additional strength for resisting increased positive and negative panel bending moments is provided with a minimum of metal at a proper location and in a convenient manner. A member 91 may also be positioned properly between horizontally extending frame members of adjacent wall panel assemblies of extended width for a similar purpose. Member 91 may also be used at the center of long spans for the purpose of alignment of the exterior surfaces of members 30 and 31, even though moment reinforcement is not required.

FIG. 19 illustrates an arrangement whereby an accent mullion 24 is attached to adjacent wall panel assemblies. As shown therein, mullion 24 is essentially channel-shaped and is engaged at spaced-apart vertical locations with the grooved retainer plate members such as 96. Each plate member 96 contains a slot and pocket 97 which receives the threaded nut means 98. The shank of bolt member 99 has a threaded end portion which cooperates with nut means 98. If desired, vertical spline 22 may be omitted when accent mullion 24 is employed. An adaptor plate 100 is arranged to cooperate wth the locating grooves 49 contained in vertical frame members 30 and 31. The head portion 101 of bolt member 99 is received in a recess in adaptor plate 100 and may be rotated using a conventional hand tool. The extruded sealing members 102 are positioned intermediate plate retainer 96 and the exteriormost face portions of frame members 30 and 31 for weathersealing purposes. Sealing members 102 may be of polyvinyl chloride or a like material. Accent mullions 24, which may be horizontally oriented forward of frame members 32 and 33 if desired, are provided for achieving architectural design efforts through added mullion depth.

Details regarding a construction for enclosing corner portions of the curtainwall system of this invention are illustrated in section in FIG. 20. Frame members 30 and 31 are of the heretofore-described standard construction. Each such frame member is illustrated as being in combination with a glazed section 105 that is mounted between glazing tapes 106 and 107. Glazing tape 106 is positioned intermediate glazed section 105 and stop 51. Glazing tape 107 is located intermediate glazed section 105 and the snap-in glazing bead 108. Bead 108 cooperates with stop 52 and snaps into a portion of dovetail groove 53 contained in the frame member. Member 109 is provided with a 90 degree departure and cooperates with locating grooves 49 contained in each vertical frame member. A cove molding member 110 bears against flange portions 42 of each vertical frame member and is secured to member 109 of the curtainwall system by fastener means 111. Portions of exterior member 112 are illustrated as cooperating with the grooves 48 contained in frame members 30 and 31. A suitable sealant 113 is contained in each locating groove 48. Any of numerous cross-sectional configurations may be provided with member 112. For instance, see the broken line configurations designated 114 and 115. Also, such corner enclosure structure may be used in connection with arrangements wherein the adjacent wall panel assemblies are at other than right angles to each other.

As shown in FIGS. 21 and 22, each vertical spline element 22 preferably includes rib portions 120 through 123 on the weather-side and rib portions 124 and 125 on the building-side. Rib portions 120 through 123 are provided to laterally restrain sealing means 58 and are terminated short of the upper end of spline element 22 a sufficient distance whereby the upper portion of spline element 22 may be positioned in a groove 48 rearwardly of the lower leg portion of a horizontal spline element 23. Similarly, rib portions 124 and 125 are terminated short of the lower end of spline element 22 a sufficient distance whereby each spline element 22 lower portion may be positioned in a groove 48 outwardly (forwardly) of the upper leg portion of a horizontal spline element 23. For further details regarding this weatherseal construction see FIG. 17.

As disclosed by FIGS. 23 and 24, horizontal spline elements 23 are each provided with a lower leg portion 126, an upper leg portion 127, an offset 128 which joins such leg portions, and a flashing leg portion 129 which is spaced-apart from and located forwardly of lower leg portion 126. Portion 126 is provided with rib members 130 and 131 to transversely restrain a cooperating sealing means 59 when such spline element is engaged with a groove 48. Similarly, upper leg portion 127 is provided with rib members 132 and 133 to laterally restrain an upper sealing means 59 when a frame member groove 48 is engaged therewith. Rib members 132 and 133 are positioned at an opposite side to rib members 130 and 131. As noted in FIG. 17, flashing leg 129 is spaced-apart from leg portion 126 a sufficient distance whereby the relieved flange portion 41 of each frame member 33 may be received therebetween. It is preferred also that spline elements 23 be provided with a slot 135 at either end to receive coupling 136 in order to provide a flashing for the joint 137 formed by butting adjacent spline elements 23 together. I prefer that no joint 137 occur in the intermediate region of a vertical spline element 22. Therefore, the rib portions 130 through 133 of each horizontal spline element 23 are relieved at each vertical spline element 22 in the manner of the relief 138 shown in FIG. 15. Such reliefs receive the upper and lower end portions of adjacent vertical spline elements. Like most panel assembly components disclosed herein, spline elements 22 and 23 may be fabricated as an aluminum extrusion.

FIGS. 25 and 26 illustrate, in perspective, details regarding an alternate form of anchor member. Anchor member 140, which may be utilized with the support bracket of either FIG. 9 or FIG. 30, is somewhat similar to previously-described anchor member 88. However, member 140 is provided with a horizontally oriented "I" flange portion 141 and with a gusset 142 which attaches portion 141 to the slotted plate portion 143.

FIG. 27 illustrates details regarding the installation of various sub-panel assemblies within the unitized frame portion of a panel assembly 19. For instance, sub-panel assembly 145 is in the form of a spandrel insert fabricated in a conventional manner and having an insulating material sandwiched between opposed, spaced-apart skin members. Sub-panel assembly 146 differs from sub-panel assembly 145 in that the exteriormost skin member is contoured to provide an often-utilized architectural design effect. In each instance, however, such sub-panel assembly is located and firmly held in place by portions of the previously-referenced stops 51 contained in the wall panel assembly, by imposts (rails) 147, and by horizontally and/or vertically oriented snap-in panel beads such as 148. Glazing tapes 149 are provided intermediate such sub-panel assemblies and the various stops 51 and snap-in beads 148. An alternate form of impost, referenced by the numeral 152, may be used to receive enclosure member 153. Such enclosure member may be used to conceal heating units and the like which are typically located near building exterior walls. In the alternative, such enclosure may serve as a conventional stool member.

In FIGS. 28 and 29 I illustrate details of the fabrication of a rail 147 into a panel frame assembly. As shown therein, a coped joint 155 is formed at each end of rail 147 and the offet tab formed at each end of rail and the offset tab formed by properly cutting each rail end is located rearwardly of stop 51. Screw fasteners 156, which preferably are of a self-tapping type, are passed through suitable holes provided in the base portion 40 of each vertical frame member 31 and 30 at the disclosed extruded indentations 151 and at a proper height. Fasteners 156 are then threaded into the longitudinal recesses 157 formed in each impost member 147. See FIG. 27 and FIGS. 31 and 32 for further illustration of recesses 157.

An alternate form of support bracket is shown in FIG. 30. Bracket 159 is generally similar to bracket 17 except that it is attached to the underside of a floor slab. Various anchor members may be secured to bracket 159 in a conventional manner and using suitable fastener devices.

Details of an improved project-in vent unit are illustrated in FIGS. 31 through 36 in combination with the unitized frame portion of the wall panel assembly of this invention. As shown therein, the resulting panel assembly includes vertical frame member 31 (and a vertical frame member 30 not shown), and the attached, spaced-apart rail members 147 and 152. Located within such framework is the vent unit designated 160.

A snap-in adaptor 161 is vertically oriented at either interior side of assembly 19. One edge of adaptor 161 cooperates with stop 51 and the other edge of adaptor 161 is engaged in a portion of dovetail groove 53. Each adaptor 161 preferably extends the full distance between rails 147 and 152, contains a vertically oriented recess 162, and carries the hinge arm 162 which is connected at one end thereof to adaptor 161 by the headed pivot connector 164. A sealing means 165 is located between each adaptor 161 and the stop 51 located adjacent thereto.

The frame portion of vent unit 160 is preferably fabricated in the manner of the frame portion of panel assembly 19. For instance, side frame members 166 and 167 (FIG. 34) and the bottom frame member 168 each have the same cross-sectional configuration. Upper frame member 169 has a similar cross-sectional configuration but has a lesser depth from inside to outside. This difference in depth will be explained further in connection with weathersealing construction provided for vent unit 160. Frame members 166 through 169 are preferably mitered at their ends and are joined together by welds and by the angle members designated 170 and 171. Members 170 are located at the lower portion of vent unit 160 whereas angle members 171 are located adjacent the upper corner portions thereof. Located within the unitized vent frame are: glazing section 172, snap-in glazing beads 173, and glazing tapes 174 and 175. Clip device 176 is provided to secure beads 173 in place prior to and during shipment of the assembled vent unit. Generally, the glazing section 172 is installed only at the erection job site.

An ear portion 177 is attached to each upper corner angle 171 and is provided with the threaded hole designated 178. Threaded pin 179 cooperates with threaded hole 178 and threaded nut means 180. A flatted section 181 contained in pin 179 passes through means 178 and 180 and has a shoulder 182 which bears against an end surface of friction block 183. Block 183 rotatably cooperates with recess 162 and has an opening 184 which receives the reduced diameter end portion 185 of pin 179. The opposite end of pin 179 is provided with the screwdriver slot 186 for effecting adjustment so as to vary the friction which exists as between recess 162 and friction block 183.

When securing the unitized frame of vent unit 160 to adaptor 161, the end of hinge arm 163 opposite the end engaged with pivot pin 164 is attached to a side frame member 166 or 167 by the headed "hat-type" pivot connector designated 187. From FIGS. 31 and 32 it will be noted that the head portion of vent unit 160 (comprised essentially of frame member 169) is thereby made retractable with respect to rail 147. Details regarding a conventional latching or handle device cooperating with frame member 168 and rail 152 are not provided in the drawings. When assembling the vent unit into a wall panel assembly it is preferred that pre-assembled elements 161 through 171, 173, and 176 through 187 be first installed in a frame assembly 19 and that afterwards rail members 147 and 152 are brought into engagement therewith. Such rail members are then secured to the frame portion of panel assembly 19 using the heretofore-described fabrication method which involves screw fastener 156.

Vent unit 160 is also provided with an improved weathersealing arrangement. The weatherseal gasket 190 extends around the entire exterior periphery of vent unit 160 and is located in the groove 191 contained in flange portion 192 of frame members 166 through 169. The contact surface of sealing means 190 butts against the surface portions 193 located interiorly of the flanges 194 provided in rail members 147 and 152 and in the flanges 195 of adaptors 161. Surfaces 193 are in a common plane. The double weatherseal arrangement for vent unit 160 is obtained through the added use of weatherseal gaskets 196 and 197. Gasket 196 is contained in the groove 198 of flange 199. This flange is a part of frame member 169. Gasket means 197 is U-shaped in elevation and is contained in the recess 200 provided in flange portions 201 of frame members 166 through 168. The contact surface of gasket means 196 lies in the same plane as the contact surface of gasket means 197. However, the flange portion 199 of frame member 169 is offset with respect to the flange portion 201 of members 166 through 168. It should be noted that gasket means 196 contacts the concealed surface of flange portion 202 of rail 147 and swings outwardly when unit 160 is projected in. Accordingly, gasket means 196 is at all times positioned above the axis of pin 179 and friction block 183. Through this arrangement a positive double weatherseal can be obtained when vent unit 160 is in a closed position.

From the foregoing description it is apparent that the curtainwall system of this invention offers important advantages with respect to fabrication and with respect to erection and installation. Because of the spaced-apart relation established between adjacent wall panel assemblies, adequate compensation for building dimensional irregularities may be readily obtained without requiring structural modification to component parts of the curtainwall system. Also, an advantageous weathersealing arrangement is provided in the above-described curtainwall system in the form of improved expansion-contraction joints. Complete weathersealing is obtained at all times even though individual wall panel assemblies are installed in irregular spaced-apart relation or are permitted to move relative to each other and relative to the building support structure.

Further, the curtainwall system of this invention is provided with an effective weathersealing arrangement for vertically and horizontally oriented expansion and contraction joints which intersect each other, and offers important advantages with respect to use of a unitized frame construction and with respect to a vent unit which obtains an effective weatherseal arrangement in combination with wall panel assembly details.

It is to be understood that the forms of the invention herewith shown and described are to be taken as preferred embodiments of the same, but that various changes in the shape, size, and arrangement of parts may be resorted to without departing from the spirit of the invention or the scope of the subjoined claims.

I claim:

1. A building structure comprising: a multi-story support structure, anchor members attached to said support structure between adjacent story levels, and prefabricated wall panel assemblies which are located in each of said adjacent story levels and which vertically thermally expand and contract differently than said support structure, said panel assemblies having horizontally-extended locating groove means at the upper and lower sides thereof and vertically-extended locating groove means at each other side thereof in intersecting relation to said horizontally-extended locating groove means, and each of said anchor members engaging said wall panel assembly lower horizontally-extended locating groove means in a vertically supporting manner at regions where said wall panel assemblies are positioned adjacent each other and engaging said wall panel assembly upper horizontally-extended locating groove means in a vertically non-restricting manner at regions where said wall panel assemblies are positioned adjacent each other whereby said wall panel assemblies are supported on said anchor members independently of each other and independently vertically thermally expand and contract relative to said support structure and said anchor members.

2. A curtainwall system comprising: a building structure, vertically-adjacent and horizontally-adjacent wall panel assemblies each thermally expanding and contracting in a vertical direction differently than does said building structure and each having a frame portion of rigid unitized construction, horizontal groove means contained in said wall panel assembly frame portions across the top and bottom sides thereof, vertical groove means contained in said wall panel assembly frame portions throughout the height of the other sides thereof, and anchor members attached to said building structure at the corner regions of said wall panel assemblies and cooperating with said groove means, said panel assembly vertical groove means intersecting said panel assembly horizontal groove means, and each of said anchor members contacting the bottom of horizontally-adjacent wall panel assembly bottom side horizontal groove means and being spaced-apart from the bottom of horizontally-adjacent wall panel assembly top side horizontal groove means thereby carrying portions of the weight only of the wall panel assemblies positioned immediately above said anchor members without restraining wall panel assemblies positioned immediately below said anchor members against thermal expansion and contraction in a vertical direction relative to said building structure.

3. In a curtainwall system attached to a building structure, prefabricated wall panel assemblies spaced-apart from each other and each having groove means around the periphery thereof, and joint means cooperating with said groove means to connect said wall panel assemblies to each other in a weather-sealed relation, said joint means including: horizontal spline elements having an upper leg portion provided with outward and inward surfaces, a lower leg portion provided with outward and inward surfaces, and offset means joining said leg portions, vertical spline elements having a lower extreme and an upper extreme and sealing means carried by each of said spline elements in said wall panel assembly groove means, said vertical spline element lower extremes being located immediately outwardly of said horizontal spline element upper leg portion and said vertical spline element upper extremes being located immediately inwardly of said horizontal spline element lower leg portion at each intersection of said spline elements.

4. The curtainwall system invention defined in claim 3, wherein said horizontal spline elements and said vertical spline elements are each provided with a plurality of sealing means rib members at opposite faces thereof, said vertical spline element rib members being relieved at either end of said vertical spline element, and said horizontal spline element rib members being relieved at a location intermediate the ends of said horizontal spline element and at the intersection of said spline elements.

References Cited in the file of this patent

UNITED STATES PATENTS

| | | |
|---|---|---|
| 2,019,236 | Richter | Oct. 29, 1935 |
| 2,538,749 | Kerbaugh | Jan. 23, 1951 |
| 2,703,004 | Kenedy | Mar. 1, 1955 |
| 2,750,015 | Hauck | June 12, 1956 |
| 2,805,741 | Evans et al. | Sept. 10, 1957 |
| 2,885,040 | Grossman | May 5, 1959 |
| 2,996,845 | Cipriani et al. | Aug. 22, 1961 |

OTHER REFERENCES

"Engineering News-Record" Magazine, Sept. 6, 1956, page 143.

"Sweets Industrial Construction" Catalog, 1960 Edition; Curtain Wall Systems, William Bayley Co.; Springfield, Ohio, copyright 1959 (Section 3a/Ba, pages 5–8).